(12) United States Patent
Scheifele

(10) Patent No.: US 12,734,847 B2
(45) Date of Patent: Sep. 15, 2026

(54) TIRE HAVING CANTILEVERED SIDEWALL SHAPE AND FLEXIBLE SUPPORT RING STRUCTURE

(71) Applicant: BRIDGESTONE AMERICAS TIRE OPERATIONS, LLC, Nashville, TN (US)

(72) Inventor: Kevin E. Scheifele, Atwater, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 0 days.

(21) Appl. No.: 18/836,082

(22) PCT Filed: Jan. 10, 2023

(86) PCT No.: PCT/US2023/060345

§ 371 (c)(1),
(2) Date: Aug. 6, 2024

(87) PCT Pub. No.: WO2023/150405

PCT Pub. Date: Aug. 10, 2023

(65) Prior Publication Data

US 2025/0135808 A1 May 1, 2025

Related U.S. Application Data

(60) Provisional application No. 63/267,615, filed on Feb. 7, 2022.

(51) Int. Cl.
*B60C 13/00* (2006.01)
*B60C 15/02* (2006.01)

(52) U.S. Cl.
CPC .......... *B60C 13/003* (2013.01); *B60C 13/002* (2013.01); *B60C 15/02* (2013.01)

(58) Field of Classification Search
CPC ......... B60C 3/04; B60C 13/00; B60C 13/001; B60C 13/002; B60C 13/003; B60C 13/04
See application file for complete search history.

(56) References Cited

U.S. PATENT DOCUMENTS

| | | | |
|---|---|---|---|
| 4,319,618 | A | 3/1982 | Suzuki |
| 4,533,183 | A | 8/1985 | Gant |
| 2015/0298498 | A1 | 10/2015 | Seradarian |

FOREIGN PATENT DOCUMENTS

| | | | | | |
|---|---|---|---|---|---|
| CA | 2915923 | C | * | 2/2019 | ............. B60B 25/04 |
| GB | 269690 | A | * | 4/1927 | ............. B60C 11/18 |

(Continued)

OTHER PUBLICATIONS

Machine translation of JP 2002-46429, 2002.*
Notice of Reason for Rejection issued by the Japanese Patent Office in JP2024-546124 on Jun. 23, 2025.

*Primary Examiner* — Justin R Fischer
(74) *Attorney, Agent, or Firm* — Shaun J. Fox; Ty Kendrick

(57) ABSTRACT

In one aspect, a tire assembly is provided, the tire assembly comprising: a tire having a tread, two shoulders, two sidewalls, and two bead portions, wherein the sidewalls are oriented radially between the respective shoulders and the respective bead portions, wherein each of the sidewalls are cantilevered in shape, with each respective shoulder projecting axially outward from the entirety of its respective sidewall, a flexible sidewall support structure oriented axially outward of and in contact with each sidewall and its respective bead portion, wherein the flexible sidewall support structure has an annular shape, wherein the flexible sidewall support structure is external to and separate from the tire, and a flexible panel oriented axially outward of an in contact with each of the tire and the flexible sidewall support structure in the region of each shoulder.

16 Claims, 4 Drawing Sheets

(56) References Cited

FOREIGN PATENT DOCUMENTS

| | | | | | |
|---|---|---|---|---|---|
| JP | 2002-46429 | | * | 2/2002 | |
| JP | 4-237610 | B2 | | 7/2005 | |
| JP | 2007-519766 | A5 | | 3/2008 | |
| JP | 4215315 | | * | 1/2009 | |
| KR | 20000011654 | U | | 7/2000 | |
| WO | WO-2016120872 | A1 | * | 8/2016 | ............. B60C 11/00 |
| WO | 2021137958 | A1 | | 7/2021 | |

* cited by examiner

TIRE HAVING CANTILEVERED SIDEWALL SHAPE AND FLEXIBLE SUPPORT RING STRUCTURE

CROSS-REFERENCE TO RELATED APPLICATIONS

This application claims priority from U.S. Provisional Patent Application No. 63/267,615, filed on Feb. 7, 2022, which is incorporated by reference herein in its entirety.

BACKGROUND

Various aspects of vehicle tires cause the vehicle tire to be more or less efficient during operation on a roadway. Similarly, various materials used in vehicle tires cause the cost of manufacturing vehicle tires to increase.

One aspect with an effect on operating efficiency is the weight of the vehicle tire. The weight of a vehicle tire is directly related to the amount of energy necessary to cause that tire to rotate during operation of a vehicle. A heavier tire requires the vehicle to expend more energy, while a lighter tire causes the vehicle to expend less energy.

Another aspect with an effect on operating efficiency is the drag on a vehicle tire during travel down a roadway. Vehicle tires having traditional profiles with sidewall portions largely in contact with air as the vehicle tire travels down a roadway experience more drag, and thus requires the vehicle to expend more energy.

One aspect with an effect on manufacturing efficiency is the amount of costly materials used in the manufacture of a tire. Obviously, where the amount of costly material can be reduced, the overall cost of manufacture of a tire is reduced.

Another aspect with an effect on manufacturing efficiency is the ability to recondition a tire. Specifically, replacing a worn tread of a tire with a new tread allows a user to greatly extend the life of the tire. On the other hand, where a tire having a worn tread cannot be retreaded, the user must discard the tire completely and buy a new replacement tire.

What is needed is a vehicle tire having increased operating and manufacturing efficiency.

SUMMARY

In one aspect, a tire assembly is provided, the tire assembly comprising: a tire having a tread, two shoulders, two sidewalls, and two bead portions, wherein the sidewalls are oriented radially between the respective shoulders and the respective bead portions, wherein each of the sidewalls are cantilevered in shape, with each respective shoulder projecting axially outward from the entirety of its respective sidewall, and a flexible sidewall support structure oriented axially outward of and in contact with each sidewall and its respective bead portion, wherein the flexible sidewall support structure has an annular shape, and wherein the flexible sidewall support structure is external to and separate from the tire.

In another aspect, a tire assembly is provided, the tire assembly comprising: a tire having a tread, two shoulders, two sidewalls, and two bead portions, wherein the sidewalls are oriented radially between the respective shoulders and the respective bead portions, wherein each of the sidewalls are cantilevered in shape, with each respective shoulder projecting axially outward from the entirety of its respective sidewall, and a flexible sidewall support structure oriented axially outward of and in contact with each sidewall and its respective bead portion, wherein the flexible sidewall support structure has an annular shape, wherein the flexible sidewall support structure is external to and separate from the tire, wherein the tire assembly is mounted upon a wheel having a two-part rim including a first rim half and a second rim half, and wherein each of the rim halves includes a rim flange.

BRIEF DESCRIPTION OF THE DRAWINGS

The accompanying figures, which are incorporated in and constitute a part of the specification, illustrate various example aspects, and are used merely to illustrate various example aspects. In the figures, like elements bear like reference numerals.

DETAILED DESCRIPTION

Figure 1:
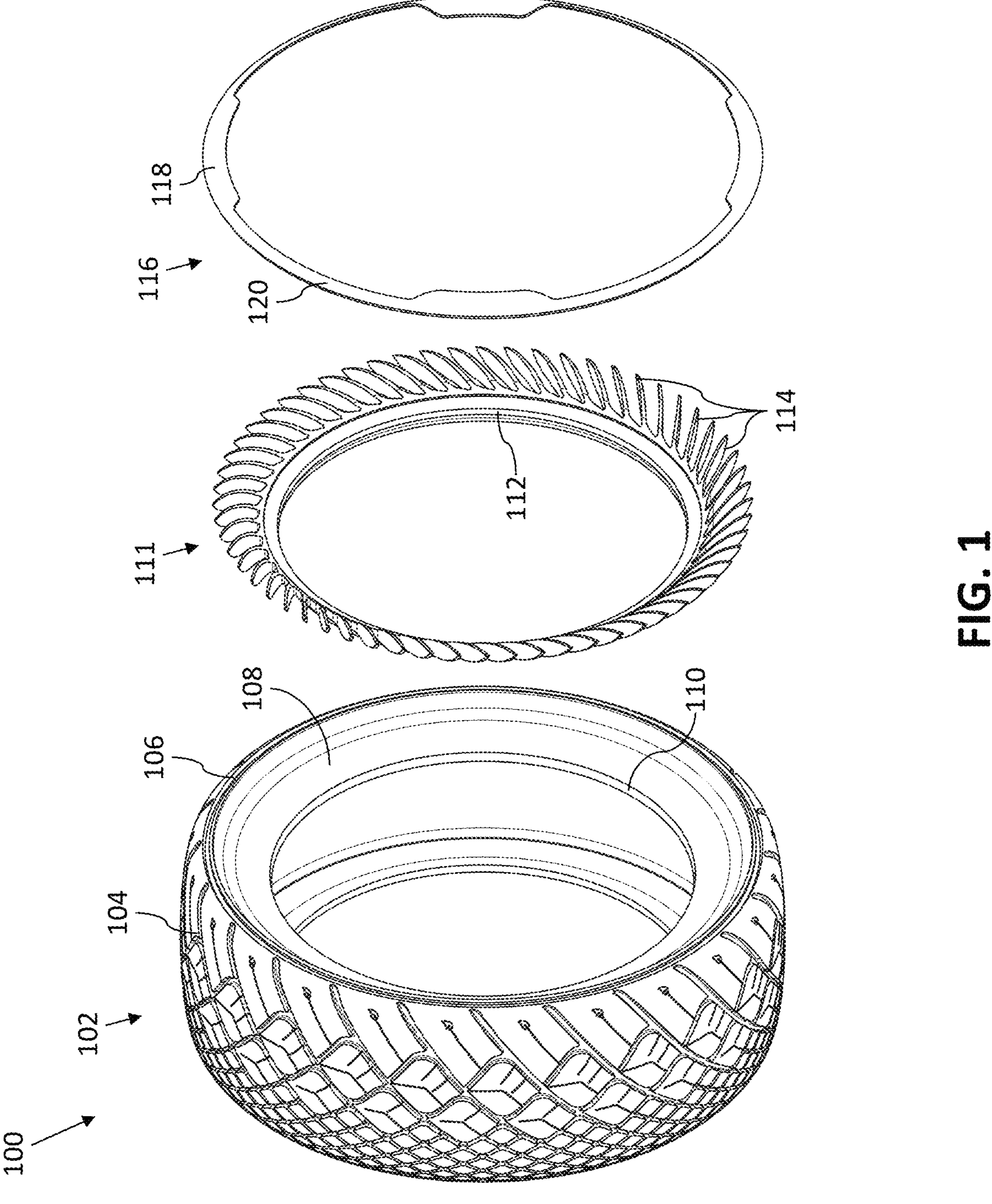
FIG. 1 illustrates an exploded perspective view of a tire assembly 100 having a cantilevered sidewall shape and flexible support ring structure.

FIG. 1 illustrates a tire assembly 100 having a cantilevered sidewall shape and flexible support ring structure. Tire assembly 100 includes a tire 102. Tire 102 may be a pneumatic tire. Tire 102 includes a tread 104, two shoulders 106, two sidewalls 108, and two bead portions 110.

Sidewalls 108 are oriented between the respective shoulders 106 and bead portions 110. Sidewalls 108 are cantilevered in shape, with shoulders 106 projecting axially outward from the entirety of sidewalls 108. The axially outward sides of sidewalls 108 are concave in shape. Sidewalls 108 are inclined, with each bead portions 110 being axially inward of its respective shoulder 106, and the respective sidewall 108 extending directly therebetween.

Sidewalls 108 are axially thinner than traditional sidewalls for similar tire sizes, aspect ratios, and load capacities. Sidewalls 108, being thinner, require less material to manufacture.

Tire 102 may be similar to a standard tire construction, including beads, body plies, belts, and the like. These features are not illustrated in the figures.

Tire assembly 100 may include a flexible sidewall support structure 111 external to, and a separate part from, tire 102. Flexible sidewall support structure 111 is annular in shape, with a size and profile configured to mate with and engage sidewalls 108. Structure 111 includes a solid inner ring 112 that is continuous about the inner circumference of structure 111. Solid inner ring 112 may engage with sidewall 108. Solid inner ring 112 may engage with bead portion 110. Solid inner ring 112 may have an axially inward-facing convex element that engages an axially outward-facing concave element on bead portion 110.

Structure 111 may include a plurality of radially outer veins 114. Veins 114 may extend radially outwardly from solid inner ring 112. Veins 114 may engage with sidewall 108. Veins 114 may engage with a radially inner portion of shoulder 106. Veins 114 may have an axially inward-facing convex element that engages an axially outward-facing concave element on sidewall 108.

Alternatively, structure 111 may include a solid radially outer ring in lieu of veins 114.

Flexible sidewall support structure 111 provides structural support to sidewall 108. That is, force applied radially, axially, or a combination of radially and axially, will be supported by both sidewall 108 of tire 102 and structure 111. Structure 111 may be bonded to one or more of sidewall 108, bead portion 110, and shoulder 106. Structure 111 may be clamped between a rim flange (such as rim flange 234A, 234B illustrated in FIG. 2) and bead portion 110. Structure 111 may be both bonded to sidewall 108, as well as clamped between a rim flange and bead portion 110.

Flexible sidewall support structure 111 may be formed from any of a variety of materials, including for example, a polymeric material, such as natural or synthetic rubber, or another elastomeric material. The choice of materials used for structure 111 may be an important consideration. The material that is used should be capable of supporting the required load in compression. Preferably, structure 111 is made of a cross-linked or uncross-linked polymer, such as a thermoplastic elastomer, a thermoplastic urethane, or a thermoplastic vulcanizate. More generally, in one aspect, structure 111 may preferably be made of a relatively hard material having a Durometer measurement of about 40 D with a high compressive modulus, E, of about 21 MPa or about 3050 psi. However, compressive modulus may vary significantly for rubber or other elastomeric materials, so this is a very general approximation. In addition, Durometer and compressive modulus requirements may vary greatly with load capability requirements.

Other advantages may be obtained when using a polymer material such as polyurethane to make flexible sidewall support structure 111 instead of the rubber of traditional tires. A manufacturer of the claimed invention may only need a fraction of the square footage of workspace and capital investment required to make traditional rubber tires. In addition, waste produced by manufacturing components from a polyurethane material may substantially less than when using rubber. This is also reflected in the comparative cleanliness of polyurethane plants, allowing them to be built in cities without the need for isolation, such that shipping costs may be reduced. Furthermore, products made of polyurethane may be more easily recyclable.

Cross-linked and uncross-linked polymers, including polyurethane and other similar non-rubber elastomeric materials may operate at cooler temperatures, resulting in less wear and an extended fatigue life of flexible sidewall support structure 111 and/or tire assembly 100 as a whole. In addition, the choice of materials for structure 111 may significantly decrease rolling resistance, leading to about a 10% decrease in fuel consumption for a vehicle using tire assembly 100. Polyurethane has better abrasion resistance and, therefore, better wear than a traditional rubber tire sidewall and, unlike rubber, it is inert, making it resistant to oxidization or reaction with other materials that make rubber harden or even crack.

In another aspect, flexible sidewall support structure 111 may also contain strengthening components such as carbon fibers, KEVLAR®, or some additional strengthening material to provide additional compressive strength to structure 111. Structure 111 may include reinforcement layers, such as reinforcement cords or mesh, embedded in or disposed in certain components (such as inner ring 112 or veins 114). The reinforcement may be formed by cords constructed of nylon, polyester, fiberglass, carbon fiber, aramid, glass, polyethylene (polyethylene terephthalate), steel, other metal, or other reinforcement materials.

In another alternative aspect, structure 111 may be constructed of metal, such as steel, aluminum, or a metal alloy.

In another possible aspect, flexible support structure 111 may be formed from a polymeric material such as polyester, nylon, and polyvinyl chloride (PVC).

Tire assembly 100 may include a flexible panel 116 having an annular shape. Flexible panel 116 may include one or more enlarged placard 118 and one or more connective portion 120, where the total of the placards 118 and connective portions 120 form the annular shape of flexible panel 116. Flexible panel 116 is oriented axially outward of an in contact with each of tire 102 and flexible sidewall support structure 111 in the region of each shoulder 106.

Flexible panel 116 may be formed from any of a variety of materials, including for example a polymeric material, such as natural or synthetic rubber, or another elastomeric material. Flexible panel 116 overlaps the radially outer portion of flexible support structure 111 and the radially inner part of shoulder 106, such that flexible panel 116 covers the junction of structure 111 and shoulder 106. Flexible panel 116 may be adhered to structure 111 and/or shoulder 106, for example via chemical bonding.

Enlarged placard 118 may include sidewall branding printed on flexible panel 116. Connective portions 120 may include printed information, branding, or decorative indicia.

Figure 2:
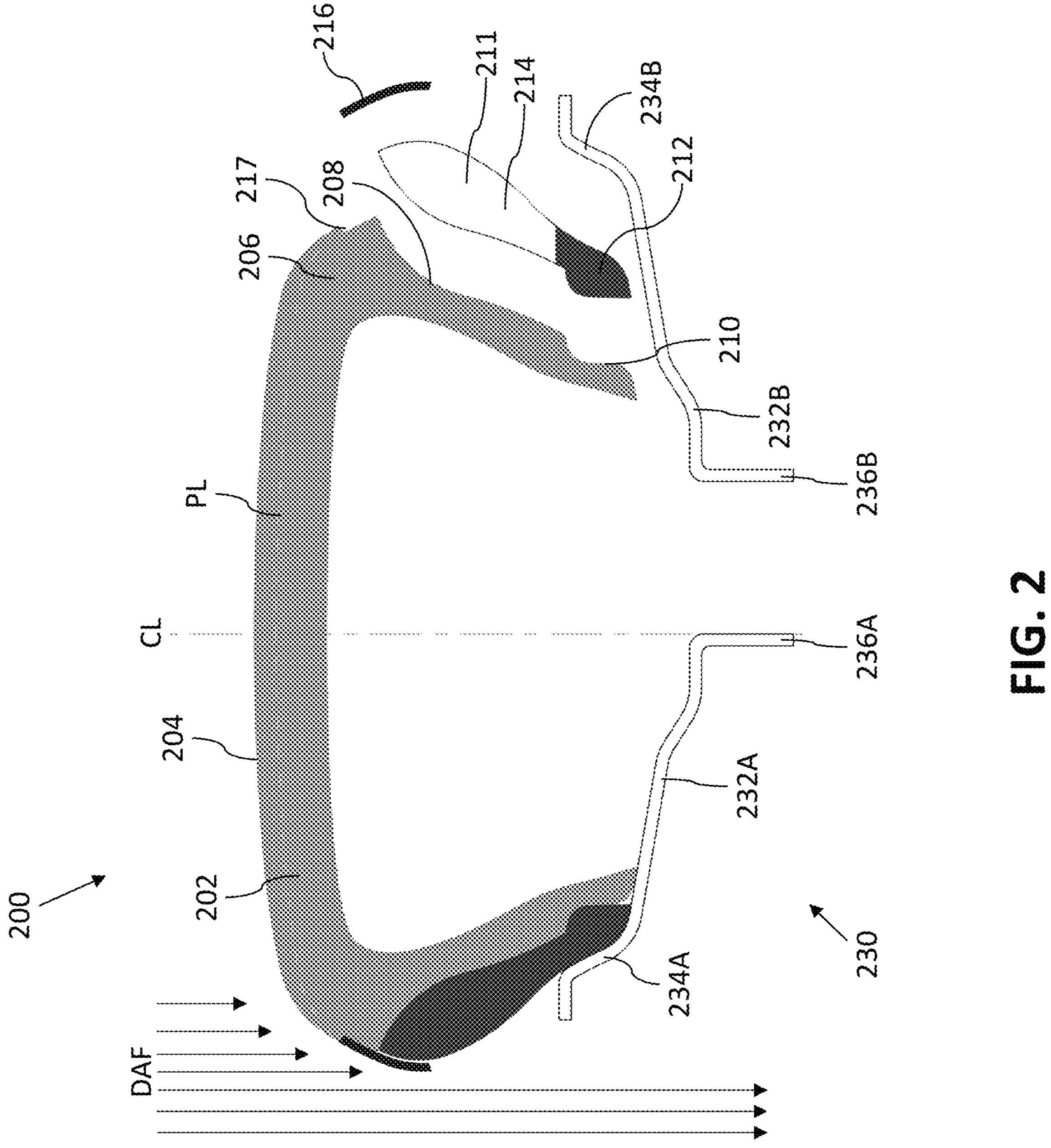
FIG. 2 illustrates an exploded sectional schematic of a tire assembly 200 having a cantilevered sidewall shape and flexible support ring structure.
Figure 3A:
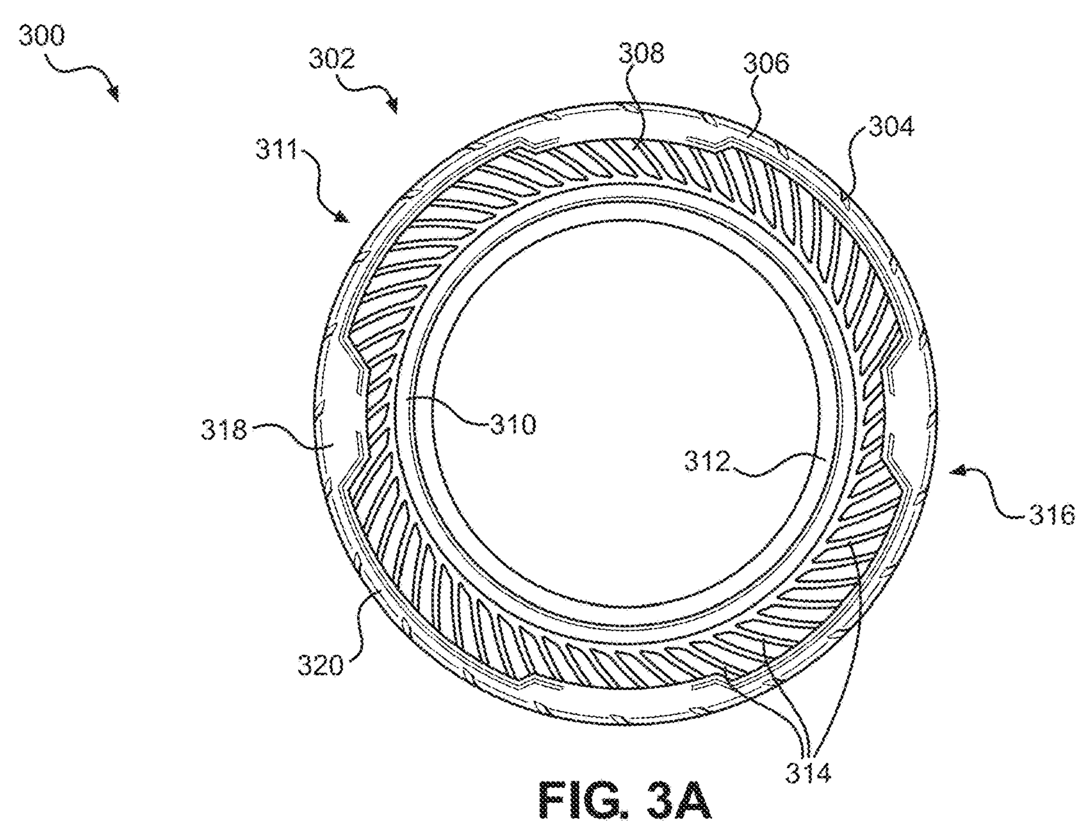
FIG. 3A illustrates a side elevation view of a tire assembly 300 having a cantilevered sidewall shape and flexible support ring structure.
Figure 3B:
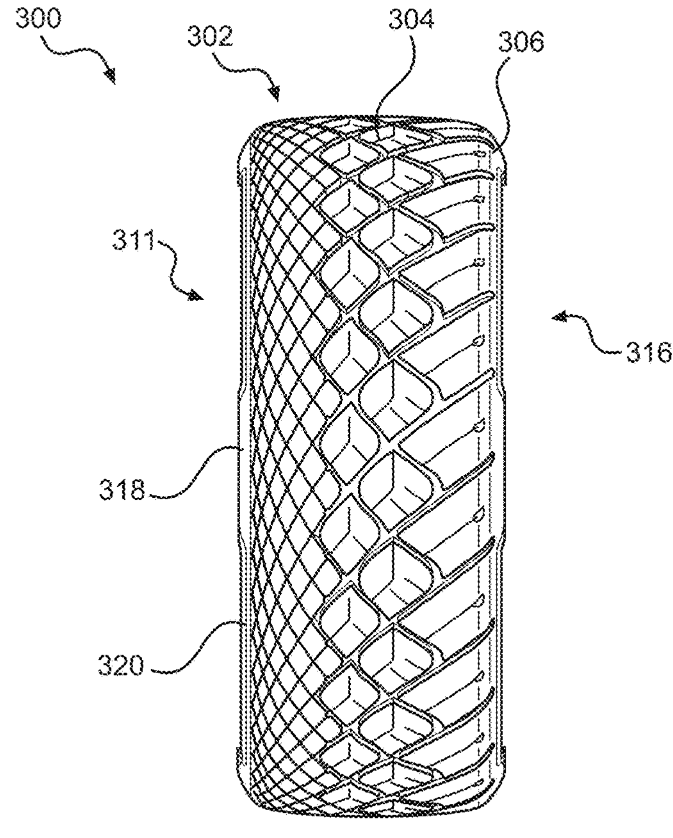
FIG. 3B illustrates a front elevation view of tire assembly 300 having a cantilevered sidewall shape and flexible support ring structure.
Figures 3C, 3D:
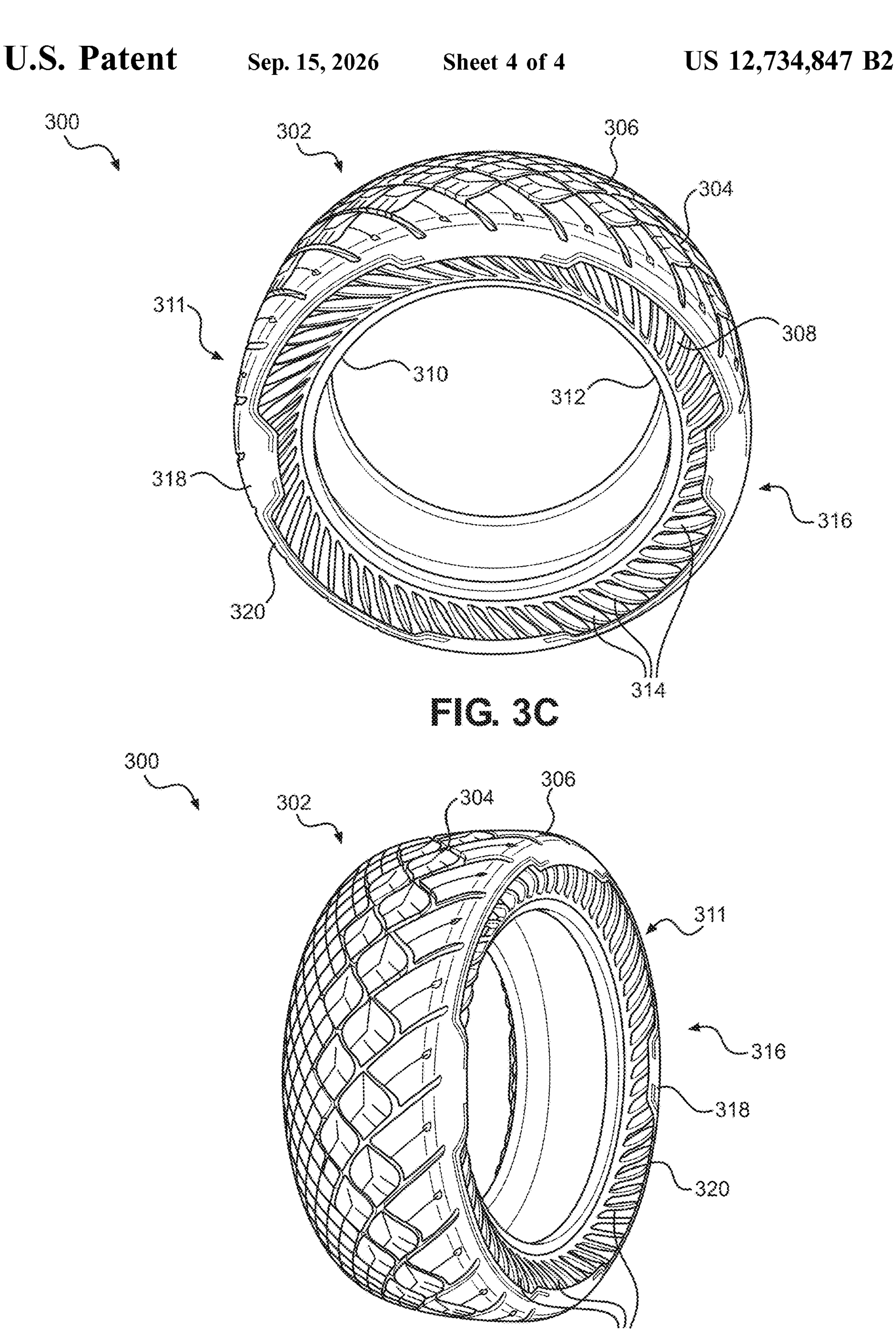
FIG. 3C illustrates a side perspective view of tire assembly 300 having a cantilevered sidewall shape and flexible support ring structure.
FIG. 3D illustrates a front perspective view of tire assembly 300 having a cantilevered sidewall shape and flexible support ring structure.

FIG. 2 illustrates a tire assembly 200 having a cantilevered sidewall shape and flexible support ring structure. Tire assembly 200 includes a tire 202. Tire 202 includes a tread 204, two shoulders 206, two sidewalls 208, and two bead portions 210. Tire 202 includes a centerline CL and a tread parting line PL. Tire 202 includes a shoulder notch 217, at least partially recessed into shoulder 206.

Tire assembly 200 includes a flexible sidewall support structure 211. Flexible sidewall support structure 211 is annular in shape, with a size and profile configured to mate with and engage sidewalls 208. Structure 211 includes a solid inner ring 212 that is continuous about the inner circumference of structure 211. Solid inner ring 212 may engage with sidewall 208. Solid inner ring 212 may engage with bead portion 210. Solid inner ring 212 may have an axially inward-facing convex element that engages an axially outward-facing concave element on bead portion 210.

Structure 211 may include a plurality of radially outer veins 214. Veins 214 may engage with sidewall 208. Veins 114 may engage with a radially inner portion of shoulder 206. Veins 214 may have an axially inward-facing convex element that engages an axially outward-facing concave element on sidewall 208.

Structure 211 may be bonded to sidewall 208. Structure 211 may be clamped between a rim flange 234A, 234B and bead portion 210. Structure 211 may be both bonded to sidewall 208, as well as clamped between a rim flange and bead portion 210.

Tire assembly 200 may include a flexible panel 216 having an annular shape. Flexible panel 216 overlaps the radially outer portion of flexible support structure 211 and the radially inner part of shoulder 206, such that flexible panel 216 covers the junction of structure 211 and shoulder 206. The radially outer portion of flexible panel 216 lays in and is bonded into shoulder notch 217. The radially outer portion of flexible panel 216 may lay in the recessed shoulder notch 217 so as to create a flush junction between the remainder of shoulder 206 and flexible panel 216. Flexible panel 216 may conceal and/or protect tread parting line PL. Flexible panel 211 may further be used to secure the radially outer portion of structure 211 to tire assembly 200.

Tire 202 may be configured to be retreaded. That is, tread 204 may wear down during operation, after which worn tread 204 may be removed from tire 202 at parting line PL. The original flexible panel 216 may be ground from tire assembly 200 to permit replacement of tread 204. A replacement tread 204 may be adhered to the remainder of tire 202, forming a seam at parting line PL. A new flexible panel 216 may be oriented to cover, conceal, or otherwise obscure parting line PL, for aesthetic purposes and/or for protective purposes.

Tire assembly 200 may be fitted to a wheel 230. Wheel 230 may have a two-part rim, with first and second rim halves 232A, 232B. Each rim half 232A, 232B includes a rim flange 234A, 234B. First and second rim halves 232A, 232B may be connected at radial portions 236A, 236B.

As illustrated in FIG. 2, arrows show the direction of air friction DAF, which represent air moving past tire assembly 200 during its operation. As can be observed, the cantilevered shape of sidewall 208 and flexible sidewall support structure 211 reduces the amount of contact/drag between direction of air friction DAF and tire assembly 200. This reduction of drag improves the fuel economy of a vehicle fitted with tire assembly 200.

FIGS. 3A-3D illustrate a tire assembly 300 having a cantilevered sidewall shape and flexible support ring structure.

Tire assembly 300 includes a tire 302. Tire 302 includes a tread 304, two shoulders 306, two sidewalls, and two bead portions 310.

Tire assembly 300 includes a flexible sidewall support structure 311. Structure 311 includes a solid inner ring 312 that is continuous about the inner circumference of structure 311. Structure 311 may include a plurality of radially outer veins 314.

Tire assembly 300 may include a flexible panel 316 having an annular shape. Flexible panel 316 may include one or more enlarged placard 318 and one or more connective portion 320, where the total of the placards 318 and connective portions 320 form the annular shape of flexible panel 316.

In practice, tire assembly 100, 200, 300 is prepared by: (1) building and curing tire 102, 202, 302, (2) separately preparing flexible sidewall support structure 111, 211, 311, (3) separately preparing flexible panel 116, 216, 316, (4) mounting structure 111, 211, 311 to tire 102, 202, 302, and (5) bonding flexible panel 116, 216, 316 to structure 111, 211, 311 and tire 102, 202, 302. Optionally, the process may include steps (4.1) (between steps (4) and (5) above, may include mounting structure 111, 211, 311 and tire 102, 202, 302 to a two-part rim with first and second rim halves 232A, 232B, and (4.2) mounting the first and second rim halves 232A, 232B to one another.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, A Dictionary of Modern Legal Usage 624 (2d. Ed. 1995). Also, to the extent that the terms "in" or "into" are used in the specification or the claims, it is intended to additionally mean "on" or "onto." To the extent that the term "substantially" is used in the specification or the claims, it is intended to take into consideration the degree of precision available in tire manufacturing. To the extent that the term "selectively" is used in the specification or the claims, it is intended to refer to a condition of a component wherein a user of the apparatus may activate or deactivate the feature or function of the component as is necessary or desired in use of the apparatus. To the extent that the term "operatively connected" is used in the specification or the claims, it is intended to mean that the identified components are connected in a way to perform a designated function. As used in the specification and the claims, the singular forms "a," "an," and "the" include the plural. Finally, where the term "about" is used in conjunction with a number, it is intended to include ±10% of the number. In other words, "about 10" may mean from 9 to 11.

As stated above, while the present application has been illustrated by the description of embodiments and aspects thereof, and while the embodiments and aspects have been described in considerable detail, it is not the intention of the applicants to restrict or in any way limit the scope of the appended claims to such detail. Additional advantages and modifications will readily appear to those skilled in the art, having the benefit of the present application. Therefore, the application, in its broader aspects, is not limited to the specific details, illustrative examples shown, or any apparatus referred to. Departures may be made from such details, examples, and apparatuses without departing from the spirit or scope of the general inventive concept.

What is claimed is:

1. A tire assembly, comprising:

a tire having a tread, two shoulders, two sidewalls, and two bead portions, wherein the sidewalls are oriented radially between the respective shoulders and the respective bead portions, wherein the shoulders include a shoulder notch, wherein each of the sidewalls are cantilevered in shape, with each respective shoulder projecting axially outward from the entirety of its respective sidewall, a flexible sidewall support structure oriented axially outward of and in contact with each sidewall and its respective bead portion, wherein the flexible sidewall support structure has an annular shape, and wherein the flexible sidewall support structure is external to and separate from the tire, and a flexible panel oriented axially outward of an in contact with each of the tire and the flexible sidewall support structure in the region of each shoulder, wherein a radially outer portion of the flexible panel lays in the shoulder notch.

2. The tire assembly of claim 1, wherein the flexible sidewall support structure has a solid inner ring.

3. The tire assembly of claim 1, wherein the flexible sidewall support structure includes a plurality of radially outer veins.

4. The tire assembly of claim 1, wherein the flexible sidewall support structure is bonded to one or more of the sidewalls, the bead portions, and the shoulders.

5. The tire assembly of claim 1, wherein the tire assembly is mounted on a two-part rim having a rim flange, and wherein the flexible sidewall support structure is clamped between the rim flange and the bead portion.

6. The tire assembly of claim 1, wherein the tire assembly is mounted on a two-part rim having a rim flange, and wherein the flexible sidewall support structure is clamped between the rim flange and the bead portion and bonded to one or more of the sidewalls, the bead portions, and the shoulders.

7. The tire assembly of claim 1, wherein the flexible panel overlaps each of the tire and the flexible sidewall support structure.

8. The tire assembly of claim 1, wherein the tire includes a tread parting line that extends to the shoulders, and wherein the flexible panel conceals the tread parting line.

9. A tire assembly, comprising:

a tire having a tread, two shoulders, two sidewalls, and two bead portions, wherein the sidewalls are oriented radially between the respective shoulders and the respective bead portions, wherein the shoulders include a shoulder notch, wherein each of the sidewalls are cantilevered in shape, with each respective shoulder projecting axially outward from the entirety of its respective sidewall, and a flexible sidewall support structure oriented axially outward of and in contact with each sidewall and its respective bead portion, wherein the flexible sidewall support structure has an annular shape, wherein the flexible sidewall support structure is external to and separate from the tire, wherein the tire assembly is mounted upon a wheel having a two-part rim including a first rim half and a second rim half, and wherein each of the rim halves includes a rim flange, wherein the flexible sidewall support structure is clamped between the rim flange and the bead portion and bonded to one or more of the sidewalls, the bead portions, and the shoulders, and wherein a radially outer portion of the flexible panel lays in the shoulder notch.

10. The tire assembly of claim 9, further comprising a flexible panel oriented axially outward of an in contact with each of the tire and the flexible sidewall support structure in the region of each shoulder.

11. The tire assembly of claim 10, wherein the flexible panel overlaps each of the tire and the flexible sidewall support structure.

12. The tire assembly of claim 10, wherein the tire includes a tread parting line that extends to the shoulders, and wherein the flexible panel conceals the tread parting line.

13. The tire assembly of claim 9, wherein the flexible sidewall support structure has a solid inner ring.

14. The tire assembly of claim 9, wherein the flexible sidewall support structure includes a plurality of radially outer veins.

15. The tire assembly of claim 9, wherein the flexible sidewall support structure is bonded to one or more of the sidewalls, the bead portions, and the shoulders.

16. The tire assembly of claim 9, wherein the flexible sidewall support structure is clamped between the rim flange and the bead portion.

* * * * *